United States Patent
Velusamy et al.

(10) Patent No.: US 10,474,391 B2
(45) Date of Patent: Nov. 12, 2019

(54) STORAGE SYSTEM AND METHOD FOR EXECUTING FILE-BASED FIRMWARE COMMANDS AND COLLECTING RESPONSE DATA

(71) Applicant: Western Digital Technologies, Inc., San Jose, CA (US)

(72) Inventors: Sivaraj Velusamy, Erode (IN); Vithya Kannappan, Bangalore (IN); Narendhiran Chinnaanangur Ravimohan, Bangalore (IN); Muralitharan Jayaraman, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 8 days.

(21) Appl. No.: 15/695,686

(22) Filed: Sep. 5, 2017

(65) Prior Publication Data
US 2019/0073156 A1    Mar. 7, 2019

(51) Int. Cl.
G06F 3/06 (2006.01)
G06F 16/188 (2019.01)

(52) U.S. Cl.
CPC .......... *G06F 3/0659* (2013.01); *G06F 3/0604* (2013.01); *G06F 3/0605* (2013.01); *G06F 3/0643* (2013.01); *G06F 3/0658* (2013.01); *G06F 3/0664* (2013.01); *G06F 3/0671* (2013.01); *G06F 3/0688* (2013.01); *G06F 16/196* (2019.01)

(58) Field of Classification Search
CPC .... G06F 3/0659; G06F 3/0643; G06F 3/0604; G06F 3/0688
See application file for complete search history.

(56) References Cited

U.S. PATENT DOCUMENTS

| 5,327,553 A | 7/1994 | Jewett et al. |
| 6,493,811 B1 | 12/2002 | Blades et al. |
| 7,688,867 B1 | 3/2010 | Kizhepat |
| 8,301,694 B2 | 10/2012 | Ittah et al. |
| 9,092,597 B2 | 7/2015 | Cohen et al. |
| 2007/0050418 A1 | 3/2007 | Lin et al. |

(Continued)

OTHER PUBLICATIONS

International Search Report and Written Opinion in PCT Application No. PCT/US2018/033448, dated Aug. 28, 2018, pp. 1-13.

*Primary Examiner* — Eric Cardwell
(74) *Attorney, Agent, or Firm* — Brinks Gilson & Lione

(57) ABSTRACT

A storage system and method for executing file-based firmware commands and collecting response data are provided. In one embodiment, a storage system is provided comprising a memory and a controller. The controller is configured to: receive a request from a host in communication with the storage system to write data in a file, wherein the file is identified by a file path name; determine whether the file path name matches a predetermined file path name; in response to determining that the file path name does not match the predetermined file path name, write the data in the file; and in response to determining that the file path name matches the predetermined file path name, execute a command represented by the data. Other embodiments are provided.

12 Claims, 6 Drawing Sheets

(56) References Cited

U.S. PATENT DOCUMENTS

2008/0126584 A1* 5/2008 Mullis .................. G06F 9/4413
710/7
2017/0068686 A1 3/2017 Broido
2018/0101449 A1* 4/2018 Kalitin ................ G06F 11/1458

* cited by examiner

STORAGE SYSTEM AND METHOD FOR EXECUTING FILE-BASED FIRMWARE COMMANDS AND COLLECTING RESPONSE DATA

BACKGROUND

Some storage systems are used by hosts that communicate with the storage system via an application layer, sending requests to read and write files in a particular file path in a file system directory. By communicating via the application layer, such hosts access the storage system via the file system and not via logical block addresses (LBAs). However, certain diagnostic and configuration functionality of the storage system may only be accessed via logical block addresses. As such, it may be necessary for a user to return the storage system to the manufacturer to perform that functionality.

DETAILED DESCRIPTION

Overview

Figure 1A:
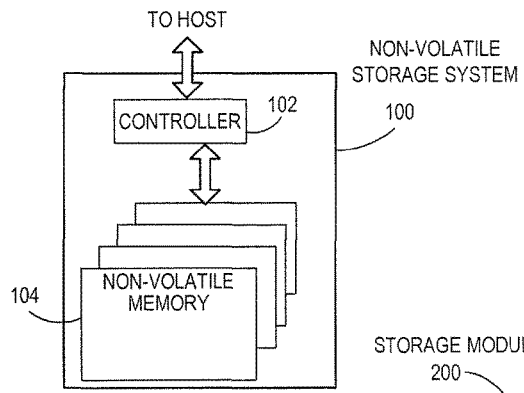
FIG. 1A is a block diagram of a non-volatile storage system of an embodiment.

By way of introduction, the below embodiments relate to a storage system and method for executing file-based firmware commands and collecting response data. In one embodiment, a storage system is provided comprising a memory and a controller in communication with the memory. The controller is configured to: receive a request from a host in communication with the storage system to write data in a file, wherein the file is identified by a file path name; determine whether the file path name matches a predetermined file path name; in response to determining that the file path name does not match the predetermined file path name, write the data in the file; and in response to determining that the file path name matches the predetermined file path name, execute a command represented by the data.

In some embodiments, the controller is further configured to write, in the file, a response to the command after the command is executed.

In some embodiments, the controller is further configured to: receive a request from the host to read the file; and in response to receiving the request from the host to read the file, send the response to the command to the host.

In some embodiments, the command is encrypted, and wherein the controller is further configured to decrypt the command prior to executing the command.

In some embodiments, the controller is further configured to identify a logical block address associated with the file path name, and wherein the controller is configured to determine whether the file path name matches a predetermined file path name by determining whether the logical block address associated with the file path name matches a predetermined logical block address.

In some embodiments, the command comprises a diagnostic command.

In some embodiments, the command comprises a configuration command.

In some embodiments, the memory comprises a three-dimensional memory.

In some embodiments, the storage system is removably connected to the host.

In another embodiment, a method for executing a command in a storage system is provided. The method is performed in a storage system comprising a memory. The method comprises: receiving a request from a host to write data in a file in the memory; based on a location of the file in a directory structure of the memory, determining that the data represents a command to be executed and not data to be written in the file; and executing the command.

In some embodiments, the method further comprises writing a response to the command after the command is executed.

In some embodiments, the method further comprises receiving a request from the host to read the file; and sending the response to the command to the host.

In some embodiments, the command is encrypted, and wherein the method further comprises decrypting the command prior to execution.

In some embodiments, the storage system identifies the location of the file in the directory structure based on an associated logical block address.

In some embodiments, the command comprises a diagnostic command.

In some embodiments, the command comprises a configuration command.

In some embodiments, the memory comprises a three-dimensional memory.

In some embodiments, the storage system is removably connected to the host.

In another embodiment, a storage system is provided comprising a memory; means for identifying a file-based request for executing a firmware command in the memory system; and means for executing the firmware command.

In some embodiments, the memory comprises a three-dimensional memory.

Other embodiments are possible, and each of the embodiments can be used alone or together in combination. Accordingly, various embodiments will now be described with reference to the attached drawings.

Embodiments

Figure 1B:
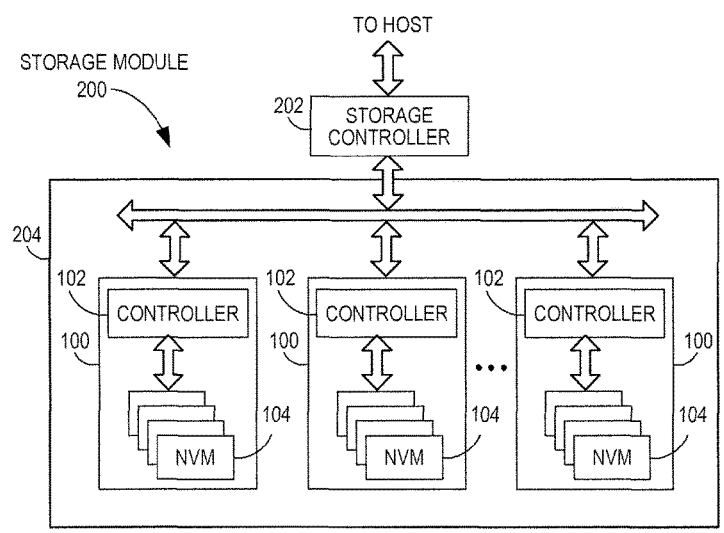
FIG. 1B is a block diagram illustrating a storage module of an embodiment.
Figure 1C:
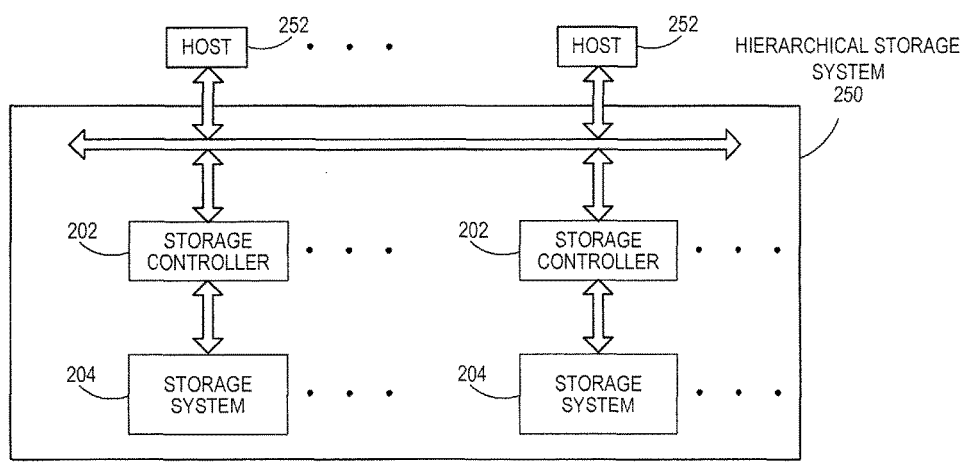
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, Re-RAM, PCM, or MRAM controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interface express (PCIe) interface, or dual-date-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
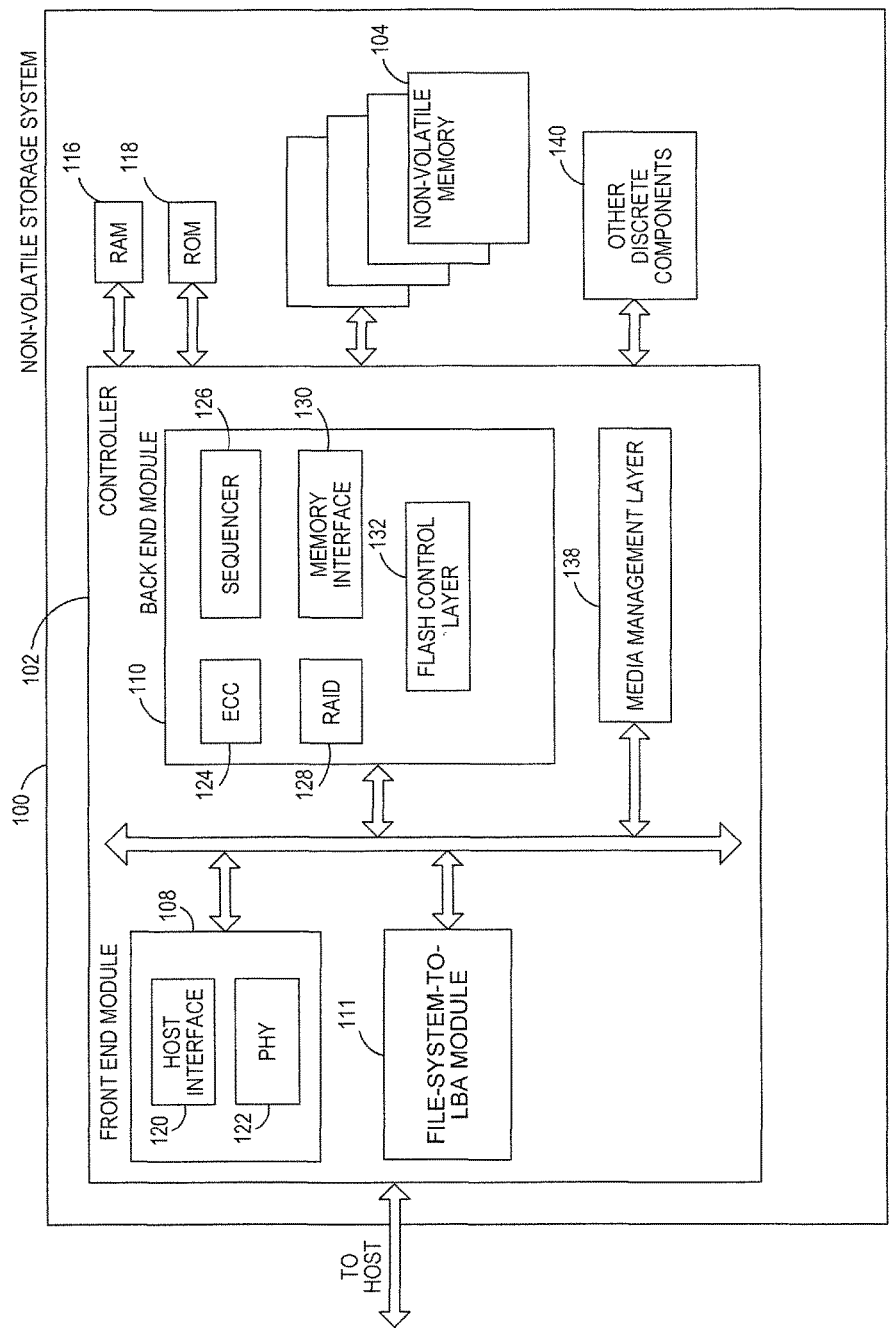
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a file-system-to-LBA module 111, which is discussed in more detail below, and can be implemented in hardware or software/firmware. The file-system-to-LBA module 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
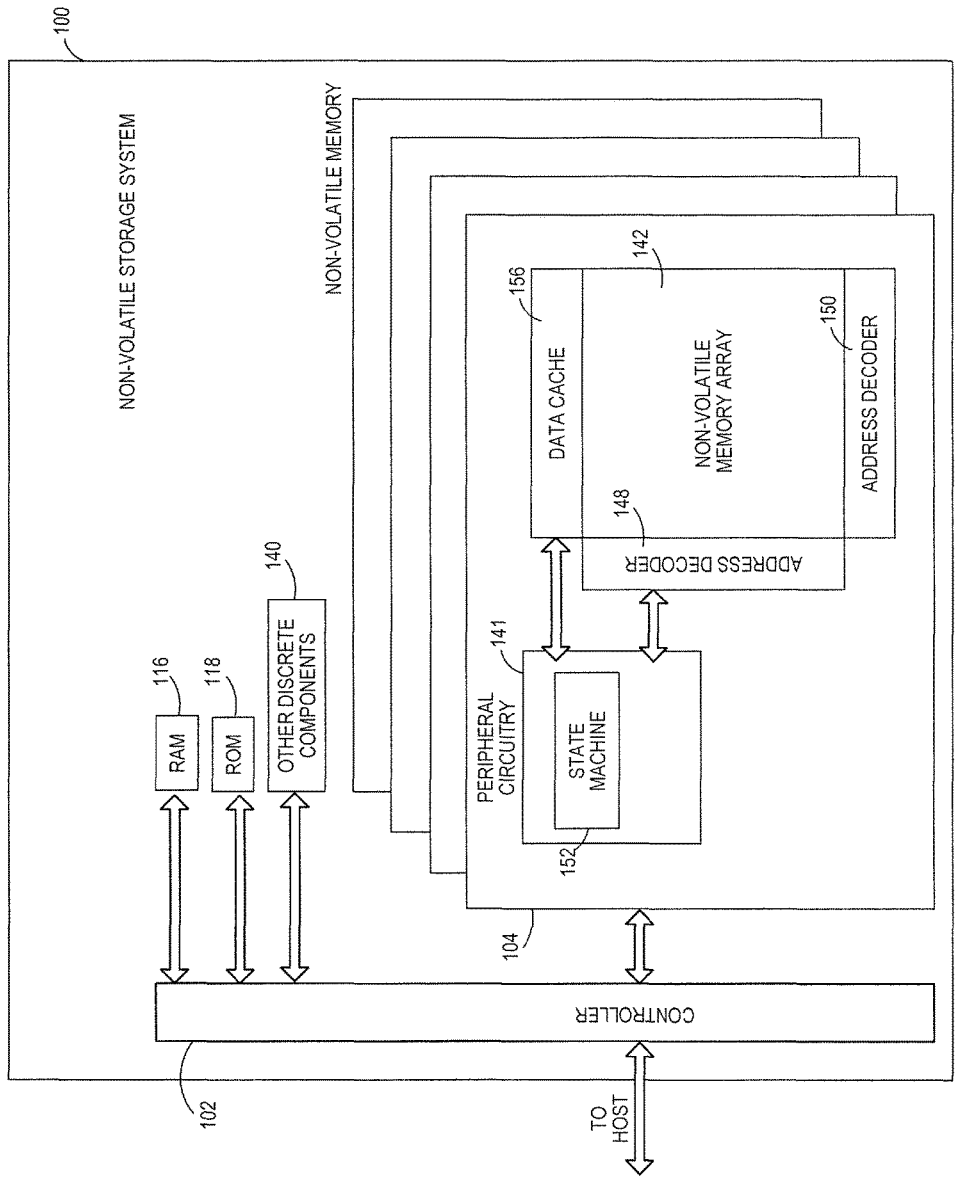
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Figure 3:
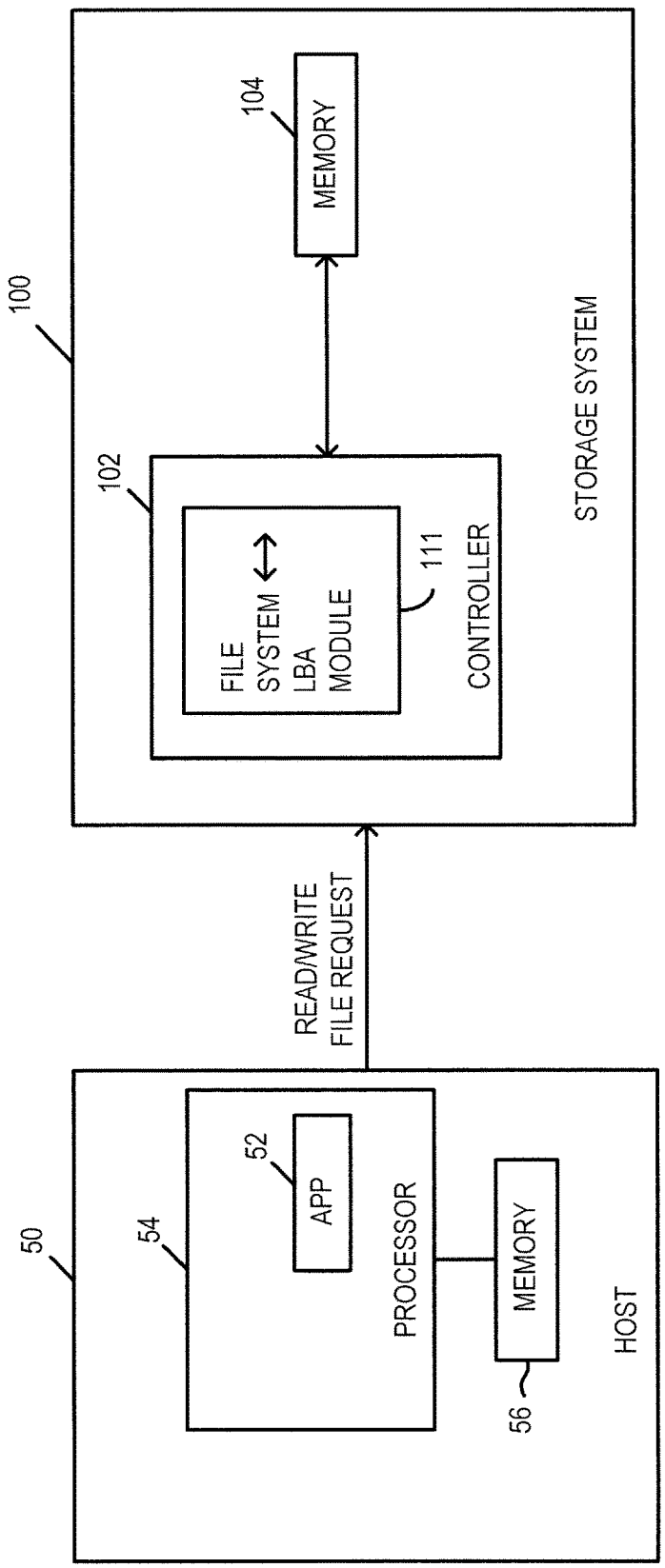
FIG. 3 is a block diagram of a host and storage system of an embodiment.

Turning again to the drawings, FIG. 3 is a block diagram of a host 50 and storage system 100 of an embodiment. For simplicity, this diagram only shows some of the possible components in the host 50 and storage system 100. Any suitable type of storage system and host can be used. For illustration purposes only, the host 50 can take the form of a mobile computing device (e.g., a mobile phone), and the storage system 100 can take the form of a memory card (e.g., a microSD card). It should be noted that these are merely examples and that other forms of a host and storage system can be used.

As shown in FIG. 3, in this embodiment, the host 50 comprises a processor 54 that runs an application ("app") 52. For example, computer-readable program code for the app 52 can be read from memory 56 and executed by the processor 54. In this embodiment, the app 52 communicates with the storage system 100 using read and write file requests. While the app 52 understands the file system structure of the memory 104 in the storage system 100, the app does not address logical block addresses (LBAs) in the memory 104. Instead, the storage system 100, which is not aware of files, uses the file-system-to-LBA module 111 in the controller 102 to convert the read/write file requests from the app 52 in the host 50 to logical block addresses, which can then be converted to physical addresses in the memory 104 by the controller 102.

As mentioned above, in situations, such as in FIG. 3, where the host 50 communicates with the storage system 100 on an application layer and not via logical block addresses, the host 50 cannot access diagnostic and configuration functionality of the storage system 100, as such functionality is only accessible via logical block addresses. This may occur, for example, in certain situations when a microSD card is used with an Android host. As such, it may be necessary for a user to return the storage system 100 to the manufacturer to perform that functionality.

For example, once the storage system 100 is released to the market, there may be no way for the host 50 to perform a diagnostic function and collect debug information from the field because the host 50 cannot execute firmware commands from the application layer. This is because LBA-level access is blocked by certain hosts. So, reporting firmware field failures and performing usage analysis may require the user to return the storage system 100 to the manufacturer, so the manufacturer can access the "raw" LBAs on the storage system 100 and run diagnostic commands.

As another example, by the host 50 not being able to execute firmware commands from the application layer, once the storage system 100 is released to the market, there may be no way for the host 50 to change firmware configurations. Configuring the storage system parameters for high performance may be important because host vendors can recommend different classes of products for different performance and endurance requirements of their applications (e.g., high performance or endurance partitioning). More specifically, different categories of storage systems may have different levels of endurance and performance. For a particular application that requires more performance or endurance, a more-expensive storage system 100 may be needed. For example, a 4k resolution video recording application with a 30 MBps speed requirement would not be able to use a storage system that operates only at 4 MBps or 10 MBps. Similar constraints may apply for a low-endurance product category with respect to the application for which it can be used. Thus, it is desirable for the host 50 to be able to configure the storage system 100 to suit a specific application in the field The following embodiments can be used to allow the host 50 to send application layer commands to the storage system 100, so that the storage system 100 can execute diagnostic and/or configuration commands from the field. In general, the storage system 100 has hardware and/or software to identify a file-based request from the host 50 for executing a firmware command in the memory system 100. In one embodiment, the storage system 100 receives a request from the host 50 to write data in a file identified by a file path name. The storage system 100 then determines whether the file path name matches a predetermined file path name. For example, the storage system 100 can use the file-system-to-LBA module 111 to identify a logical block address associated with the file path name and then determine whether that logical block address matches a predetermined logical block address. If the file path name does not match the predetermined file path name, the storage system 100 can treat the write request as a normal write request and write the data in the file in memory 104 (e.g., at the physical address mapped to the determined logical block address). However, if the file path name matches the predetermined file path name, the storage system 100 recognize that the data actually represents a command to be executed and is not actually data to be written in the file. As such, the storage system 100 can execute the command.

Figure 4:
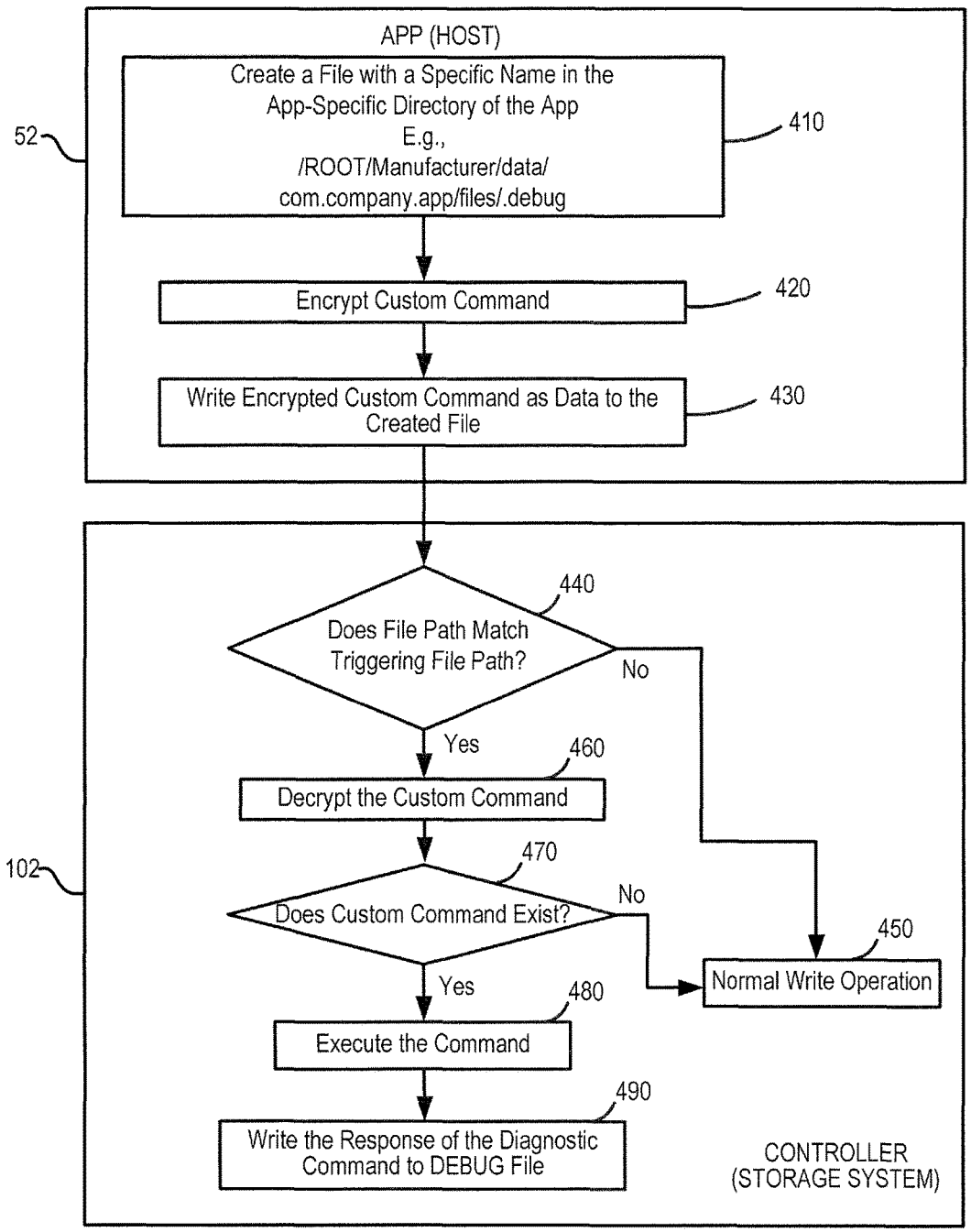
FIG. 4 is a flow chart of a method of an embodiment for executing a file-based firmware command.

FIG. 4 is a flow chart illustrating the operation of this embodiment. Here, the app 52 running on the host 50 is responsible for interacting with the storage system 100. Of course, this is just one example, and other implementations are possible. As shown in FIG. 4, in this example, the app 52 in the host 500 first creates a file with a specific name in the app-specific directory of the app (act 410). As noted above, in this embodiment, the app 52 does not have direct access the LBAs of the storage system 100, as it accesses the storage system using a file system. By creating a file in a specific path in the file system of the storage system 100, the storage system 100 can intelligently detect that the app 52 is sending the storage system 100 a particular firmware custom command and execute it. In one embodiment, the specific file path is hardcoded in the storage system 100 as the triggering file path for executing a special command (and not merely a location for storage of data). In this particular example, the triggering file is called ".debug" under the app specific directory "/Manufacture/data/com. company.app/files/". Of course, this is merely an example, and any desirable, suitable file path can be used. Next, the app 52 optionally encrypts the custom command (act 420). The app 52 then writes the command as data to the created file (act 430).

When the storage system 100 receives the write command, it checks to see if the file path matches the hardcoded, triggering file path (e.g., based on a location of the file in a directory structure of the memory 104) (act 440). This hardcoded path within the file system is where the storage system 100 anticipates where the diagnostic file writes will happen. For example, in one implementation, in the fresh state of the firmware, the storage system 100 monitors writes to LBA0. LBA0 either has the master boot record (MBR) or the partition boot record (PBR). LBA0 is typically written during creation of the file system image by the host 50. The MBR points to the PBR, and the PBR points to the root directory. This address is stored in the storage system 100. Writes to the root directory are monitored to see if the next leaf path is created, and the directory address of that folder is acquired. For example, if the file path is ./Manufacturer/data/com.company.app, the root directory is monitored for creation of the "Manufacturer" directory, and, using that, the address of that directory is acquired. Writes to this directory are monitored to determine if the next leaf path "data" directory is created or not and so on until the final destination directory's address is acquired. Writes to this directory can be monitored to see if the special diagnostic file is created. If creation of this file is detected, the contents of this file are read. If the signature matches the diagnostic signature, then the card goes ahead and detects the opcode and translates it to specific functions like error log read, hot count data read, etc.

As discussed above, the structure of the file path in this example is that the MBR has the PBR address, the PBR has the root directory's address, the root directory has the next child directory's address, and so on. In case of a closed-ended write command (e.g., block count input by the host 50 in advance), the implementation can have overhead only if the command contains the already identified MBR, PBR, directory, etc. The front-end firmware can monitor the start LBA and the block count and if any of the special structures already learned during the format time are part of the command, then the RAM location of the incoming data to those structures can be parsed by the firmware to understand if the address of the child structures are modified. If the addresses of the child structures are modified, they can be updated in the memory 104 (e.g., in a special firmware structure). In case of open-ended commands, the front-end firmware may not be able to predict if the addresses of the special structures it has already remembered are going to be part of that write or not. A hardware mechanism called auto transfer can handle the transfer of data from the host interface module to the flash interface module with minimal firmware involvement. In this case, there can be several ways to minimize the overhead. For example, the firmware can input the addresses of the special structures to a hardware engine, and an interrupt mechanism can be used to wake up a component to parse the data to these special addresses to see if the next child file system structure's address is updated or not. As another example, low-level firmware can perform these functions.

Returning to FIG. 4, if the file path does not match the hardcoded, triggering file path, the storage system 100 writes the data to the file in a normal write operation (act 450). However, if the file path does match the hardcoded, triggering file path, the storage system 100 recognizes that the data is actually a custom command. If the custom command was encrypted, the storage system 100 can decrypt it (act 470). The storage system 100 then determines if the custom command exists in the storage system 100 (act 470). If the custom command does not exist, the storage system 100 writes the data in the file in a normal write operation (act 450). However, if the custom command does exist, the storage system 100 executes the command and writes the response to the command (e.g., as required per the custom command spec) in the file (act 490). For example, if the command was a diagnostic command, the storage system 100 can write the debug response to the file.

Figure 5:
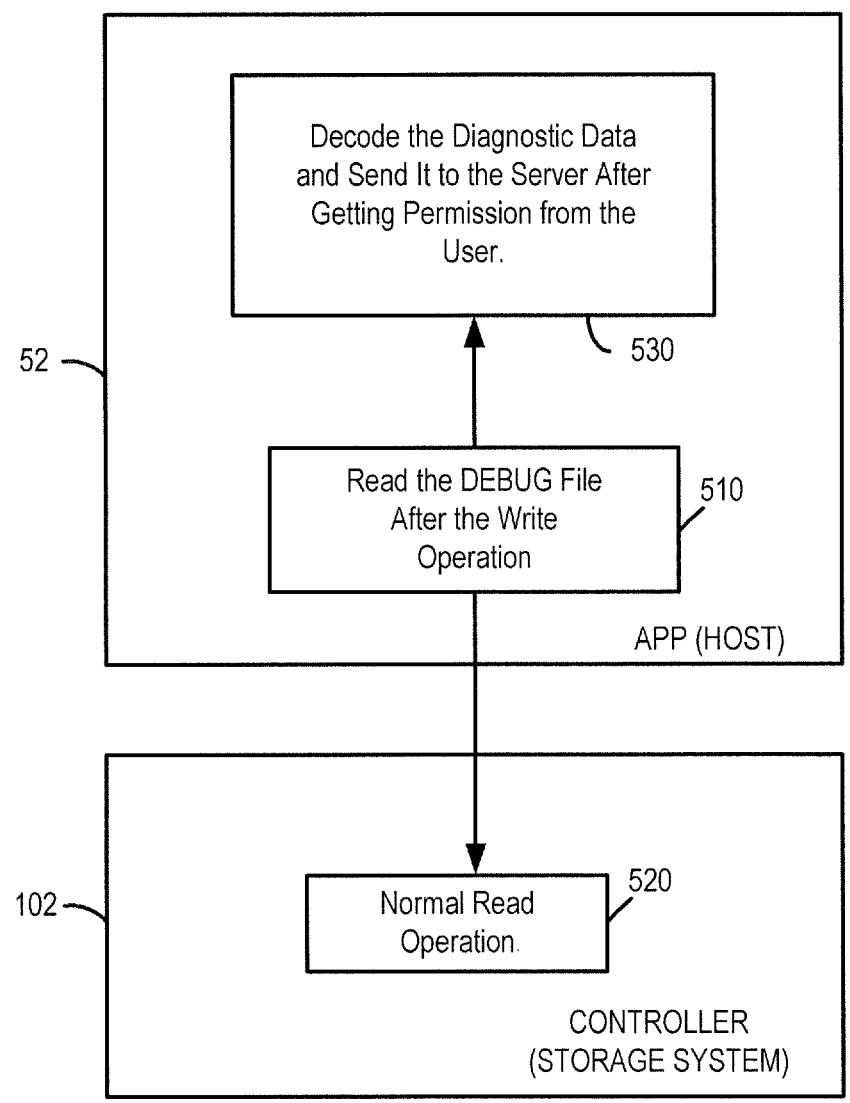
FIG. 5 is a flow chart of a method of an embodiment for collecting response data to an executed file-based firmware command.

Turning again to the drawings, FIG. 5 is a flow chart of a method of an embodiment for collecting response data to an executed file-based firmware command. As shown in FIG. 5, after the storage system 100 acknowledges that the command was successfully executed, the app 52 can send a request to the storage system 100 to read the file (act 510). The storage system 100 responds to this request by performing a normal read operation of the file and returning the data stored therein, which, in this example, is the result of a diagnostic operation (e.g., an error log read and a hot count data read) (act 520). The app 52 then decodes the returned data and can send it to a server or another external component (e.g., after getting permission from the user) (act 530).

It should be noted that the command sent by the app 52 can take any suitable form and can be for any suitable operation. For example, through an option in the app 52, a user can create permanent or temporary high-performance partitions or folders by permanently or temporarily sacrificing capacity. In one implementation, the user can create a folder and select the high performance option and then select an amount of data to give high performance for. This can be at the cost of capacity loss based on the high performance amount of data, which can require approved from the user. If the partition is a temporary high performance partition, after its use is completed, the user can select an option to clean up the partition during idle time, thus gaining back the lost capacity. Also, an already-created partition or folder can be converted to high performance. There can be several options to create a high performance partition/folder without compromising capacity but with endurance compromise. The endurance percentage loss can be announced to the user.

As another example, through an option in the app 52, a user can create a permanent or temporary high-endurance partition or folder. In one implementation, copied data will have more endurance, and the endurance benefit will be announced to the user. There can be several options (e.g., a high-endurance partition with capacity reduction and better performance, and a high-endurance partition without capacity reduction but compromising performance). The capacity or performance reduction percentage can be announced to the user. Also, an already-created partition or folder can be converted to high endurance, so that it will be applicable to files to be copied after that.

There are several advantages associated with these embodiments. For example, these embodiment can enable low-cost storage systems to be used for high performance/endurance applications. These embodiments also allow the host 50 to collect usage data and failure analysis in real-time without the need to return the storage system 100 to the manufacturer. Such data can be used to design better storage system in the future.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a memory; and
   a controller in communication with the memory, wherein the controller is configured to:
   receive a request from a host in communication with the storage system to write data in a file, wherein the file is identified by a file path name and the host does not address logical block addresses in the memory and, thus, cannot access diagnostic or configuration functionality only accessible by logical block addresses;
   determine whether the file path name matches a predetermined file path name;
   in response to determining that the file path name does not match the predetermined file path name, write the data in the file; and
   in response to determining that the file path name matches the predetermined file path name:
   execute a command represented by the data;
   write, in the file, a response to the command after the command is executed;
   receive a request from the host to read the file; and
   in response to receiving the request from the host to read the file, send the response written in the file to the host;
   wherein:
   the file is requested to be written to by the host to execute the command;
   the file is read by the host to provide the response to the command; and
   the command comprises a diagnostic command or a configuration command.

2. The storage system of claim 1, wherein:
   the command is encrypted; and
   the controller is further configured to decrypt the command prior to executing the command.

3. The storage system of claim 1, wherein the controller is further configured to:
   identify a logical block address associated with the file path name; and
   determine whether the file path name matches a predetermined file path name by determining whether the logical block address associated with the file path name matches a predetermined logical block address.

4. The storage system of claim 1, wherein the memory comprises a three-dimensional memory.

5. The storage system of claim 1, wherein the storage system is removably connected to the host.

6. A method for executing a command in a storage system, the method comprising:
   performing the following in a storage system comprising a memory:
   receiving a request from a host to write data in a file in the memory, wherein the host does not address logical block addresses in the memory and, thus, cannot access diagnostic or configuration functionality only accessible by logical block addresses;
   based on a location of the file in a directory structure of the memory, determining that the data represents a command to be executed and not data to be written in the file;
   executing the command;
   writing, in the file, a response to the command after the command is executed;
   receiving a request from the host to read the file; and
   in response to receiving the request from the host to read the file, sending the response written in the file to the host;
   wherein:
   the file is requested to be written to by the host to execute the command;
   the file is read by the host to provide the response to the command; and
   the command comprises a diagnostic command or a configuration command.

7. The method of claim 6, wherein:
   the command is encrypted; and
   the method further comprises decrypting the command prior to execution.

8. The method of claim 6, wherein the storage system identifies the location of the file in the directory structure based on an associated logical block address.

9. The method of claim 6, wherein the memory comprises a three-dimensional memory.

10. The method of claim 6, wherein the storage system is removably connected to the host.

11. A storage system comprising:
    a memory;
    means for receiving a request from a host to write data in a file in the memory, wherein the host does not address logical block addresses in the memory and, thus, cannot access diagnostic or configuration functionality only accessible by logical block addresses;

means for determining that the data represents a command to be executed and not data to be written in the file, based on a location of the file in a directory structure of the memory;
means for executing the command;
means for writing, in the file, a response to the command after the command is executed;
means for receiving a request from the host to read the file; and
means for sending the response written in the file to the host in response to receiving the request from the host to read the file;
wherein:
  the file is requested to be written to by the host to execute the command;
  the file is read by the host to provide the response to the command;
  at least one of the means comprises a processor; and
  the command comprises a diagnostic command or a configuration command.

12. The storage system of claim 11, wherein the memory comprises a three-dimensional memory.

* * * * *